US006688336B2

(12) United States Patent
Trichard

(10) Patent No.: US 6,688,336 B2
(45) Date of Patent: Feb. 10, 2004

(54) SEALING TERMINAL FOR TUBULAR DUCT

(75) Inventor: Claud Trichard, Saint-Andre Farivillers (FR)

(73) Assignee: Novaplastic (FR)

( * ) Notice: Subject to any disclaimer, the term of this patent is extended or adjusted under 35 U.S.C. 154(b) by 248 days.

(21) Appl. No.: 09/813,610

(22) Filed: Mar. 21, 2001

(65) Prior Publication Data

US 2001/0054800 A1 Dec. 27, 2001

(30) Foreign Application Priority Data

Apr. 27, 2000 (FR) .............................. 00 05415

(51) Int. Cl.⁷ ................................................ F16L 55/10
(52) U.S. Cl. ............................ 138/89; 138/90; 138/91; 220/304; 220/203.19; 220/203.24; 220/203.28; 220/303
(58) Field of Search ............................. 138/89, 90, 91; 220/203.01, 203.19, 203.24, 203.28, 303, 304

(56) References Cited

U.S. PATENT DOCUMENTS

| | | | | |
|---|---|---|---|---|
| 2,459,668 A | * | 1/1949 | Melichar | 220/304 |
| 2,560,867 A | * | 7/1951 | Hoppes | 220/304 |
| 2,730,136 A | * | 1/1956 | Phillips | 138/96 T |
| 3,017,047 A | * | 1/1962 | Payson et al. | 215/329 |
| 3,253,963 A | * | 5/1966 | Sabatino | 220/303 |
| 3,255,916 A | * | 6/1966 | Rice | 220/304 |
| 3,821,969 A | * | 7/1974 | Sinko | 138/89 |
| 3,893,487 A | * | 7/1975 | Engelking | 138/89 |
| 4,815,783 A | * | 3/1989 | Montreuil et al. | 215/228 |
| 5,160,054 A | * | 11/1992 | Nolte | 220/374 |
| 5,701,935 A | * | 12/1997 | Vasudeva | 138/89 |
| 6,062,263 A | * | 5/2000 | Donovan et al. | 138/89 |
| 6,142,186 A | * | 11/2000 | Donovan et al. | 138/89 |
| 6,250,337 B1 | * | 6/2001 | Bevacco | 138/89 |

* cited by examiner

Primary Examiner—James Hook
(74) Attorney, Agent, or Firm—Cantor Colburn LLP

(57) ABSTRACT

A sealing terminal for an installations duct of tubular shape is provided. The sealing terminal includes a plug having a threaded frustoconical part which can be screwed into one end of the duct, a manipulating head with a peripheral shoulder in a continuation of the plug, where the peripheral shoulder is designed to face an edge face of a border around an opening of the duct, and an annular seal arranged against the peripheral shoulder.

8 Claims, 2 Drawing Sheets

SEALING TERMINAL FOR TUBULAR DUCT

TECHNICAL FIELD

The present invention relates to the technical field of networks for transporting energy fluids or signals. These transport networks comprise installations duct elements connected end to end and inside which cables, pipes or wires are laid. A network such as this may be underground or underwater.

The present invention relates more particularly to a sealing terminal for an installations duct, or an installations duct element.

BACKGROUND OF THE INVENTION

The term "installations duct" is intended to mean any plastic tube, for example made of high-density polyethylene (HDPE), which is sealed with respect to the outside against liquids, and with respect to the inside, against any fluid, including one under pressure. A tube such as this is also rigid enough to mechanically withstand any load, such as the weight of a head of earth due to the installations duct being buried, and flexible enough to be handled, for example would into a drum.

To store or transport the installations duct elements before they are connected, these may be filled with a liquid, for example air under pressure, for example at 0.5 bar, then plugged at their two respective ends. This in particular makes it possible to counter the weakening of said ducts which is associated with the increase in their temperature, for example when exposed to the sun.

Part of the problem is that installation ducts, for example of tubular shape, made of a plastic of the HDPE type, are generally black in color.

The duct elements are often stored or transported out of doors, and their black color encourages them to absorb radiation from the sun, thus encouraging them to heat up. It is not rare for such ducts to reach temperatures of the order of 60° C., thus causing the material of which they are made to soften.

This increase in temperature therefore weakens the duct elements, which may become crushed, particularly when they are piled up on a storage area or on a truck. The internal pressurization makes it possible to avoid this problem of crushing, but this heating-up substantially raises the pressure inside these ducts. By way of example, the internal pressure may reach 3 to 5 bar.

The plugging means used at the two ends have therefore to withstand high internal pressures, and the seal against the inside has to be maintained for such pressures.

SUMMARY OF THE INVENTION

The object of the present invention therefore is to seal installations duct elements in a simple way so that during their transport and storage they can withstand high mechanical stresses and, in particular, high internal pressures.

The object assigned to the present invention is achieved by means of a sealing terminal for a tubular installations duct.

According to the invention, the sealing terminal comprises:

a plug comprising a threaded frustoconical part, the screw thread of which is, for example, self-tapping, which can be screwed into one end of the duct, a manipulating head with a peripheral shoulder in the continuation of the plug, said peripheral shoulder being designed to face an edge face of the border around an opening of the duct, and an annular seal arranged against the peripheral shoulder.

The object assigned to the present invention is also achieved using a method for plugging a plastic tubular installations duct for storage and transport, consisting in plugging in a sealed manner the ends of the pressurized duct or duct intended to be pressurized.

According to the invention, the method consists in cutting the end of the duct transversely to its longitudinal axis (y–y') so as to obtain an edge face whose annular surface, with no roughnesses, lies in a plane orthogonal to the longitudinal axis (y–y'), in using a sealing terminal according to any one of claims 1 to 8 for said end of the duct, in screwing the plug into the corresponding end of the duct in an axial direction (F), and in compressing the annular seal between the peripheral shoulder and the corresponding edge face (1*a*) in the axial direction (F), to finish the screwing operation of the previous step.

One advantage of the sealing terminal according to the invention lies in the fact that it allows sealing to be achieved on the outside of the duct, thus increasing the simplicity of construction and its reliability.

Another notable advantage lies in the fact that the sealing terminal makes it possible to maintain the seal even when it is subjected to high pressures.

Another advantage lies in the fact that the sealing is achieved on the edge face of the duct, which is capable of withstanding a high axial load from the sealing terminal.

Another advantage of the sealing terminal is associated with its great simplicity of use.

BRIEF DESCRIPTION OF THE DRAWINGS

Other characteristics and advantages will also become apparent from the detailed description appended hereto by way of nonlimiting example with reference to the appended drawings in which.

DETAILED DESCRIPTION OF THE PREFERRED EMBODIMENT

Figure 1:
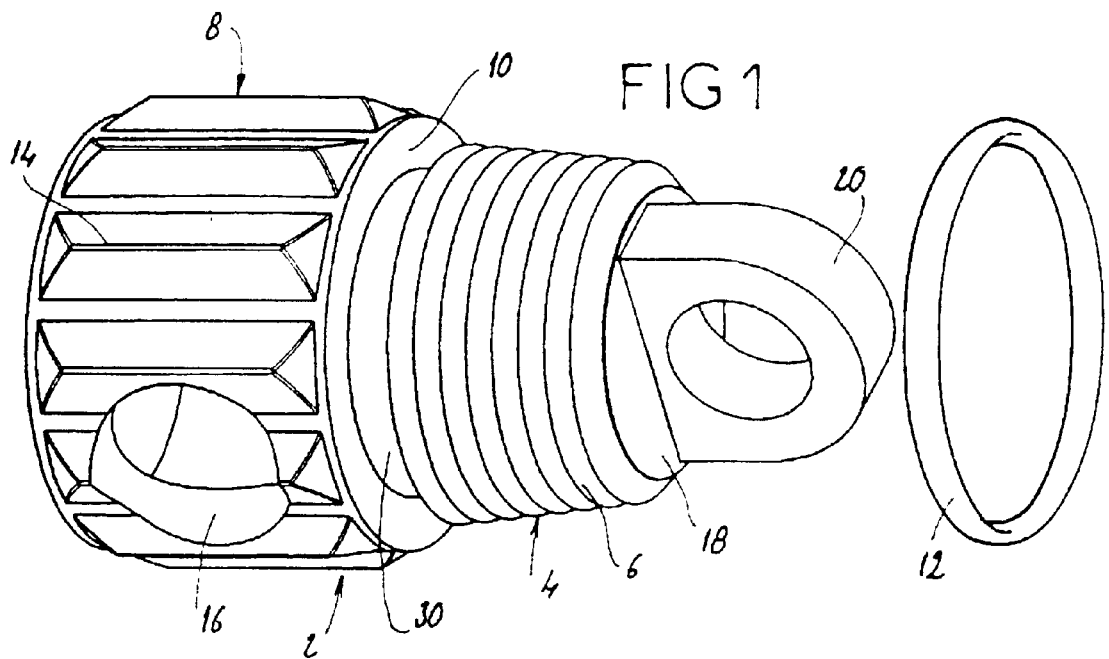
FIG. 1 depicts one embodiment of a sealing terminal according to the invention, shown in an exploded and perspective view.

The sealing terminal 2 depicted in FIG. 1 comprises a threaded frustoconical plug 4. The latter has a self-tapping screw thread 6 allowing it to cut a helical thread inside an installations duct 1 when said plug 4 is screwed into an end of the duct 1.

The sealing terminal 2 also comprises a manipulating head 8, which has a peripheral shoulder 10 in the coaxial continuation thereof. The peripheral shoulder 10 is intended to face an edge face 1*a* of the opening that is to be plugged of the duct 1.

The sealing terminal 2 also comprises an annular seal 12 shown in FIG. 1 and arranged in a groove 30 formed between the head 8 and the threaded part of the plug 4. The annular seal 12 is, for example, an O-ring, the constituent material of which is chosen from viscoelastic materials, for example elastomer.

The manipulating head 8 is externally equipped with knurling 14 roughly parallel to a longitudinal axis (y–y') of the duct 1. The knurling 14 may just as easily be replaced with flats (not depicted).

Advantageously, the manipulating head 8 may comprise an attachment means. The latter is, for example, a transverse drilling 16.

According to one embodiment according to the invention, the plug 4 is continued at its free end 18 with an attachment eye 20.

The sealing terminal 2 is preferably made as a single hollow part obtained by molding or injection molding a technical-grade plastic. The material of which the sealing terminal 2 is made is preferably chosen from materials of the technical-grade polymer plastic type, which may or may not be filled.

Figure 3:
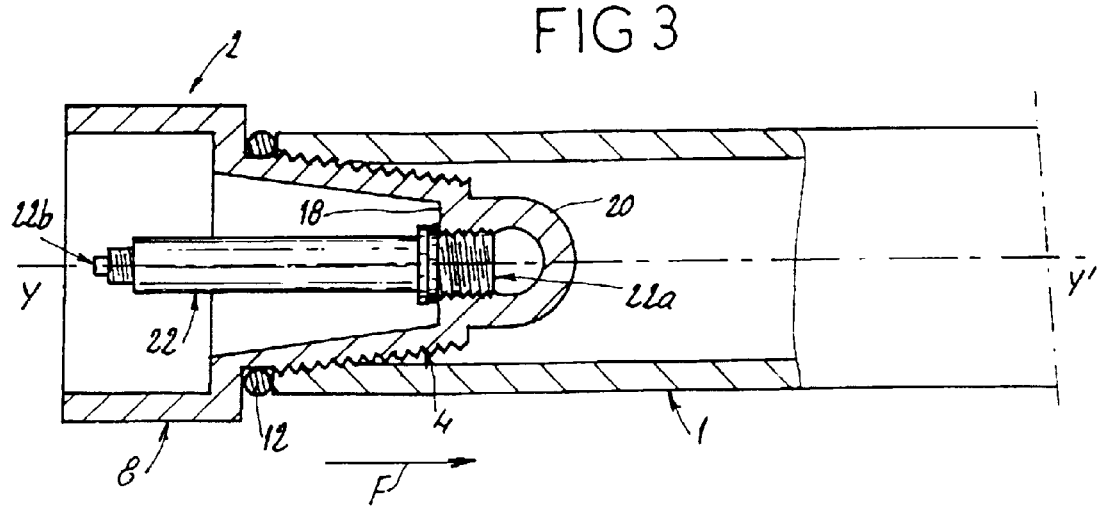
FIG. 3 depicts a view in section of an alternative form of embodiment of the sealing terminal according to the invention.

According to another embodiment according to the invention and depicted in FIG. 3, the sealing terminal 2 comprises a pressurizing valve 22 mounted on the free end 18 constituting the small base of the threaded frustoconical part of the plug 4.

The pressurizing valve 22 thus allows compressed air to be introduced into the duct 1 when the latter is already plugged with the sealing terminals 2. The pressurizing valve 22 is centered in the plug 4, and one 22a of its ends is screwed into the free end 18, passing through the plastic wall to communicate with the interior volume of the duct 1. The other end 22b of the pressurizing valve 22 remains accessible and protected by the manipulating head 8.

Figure 2:
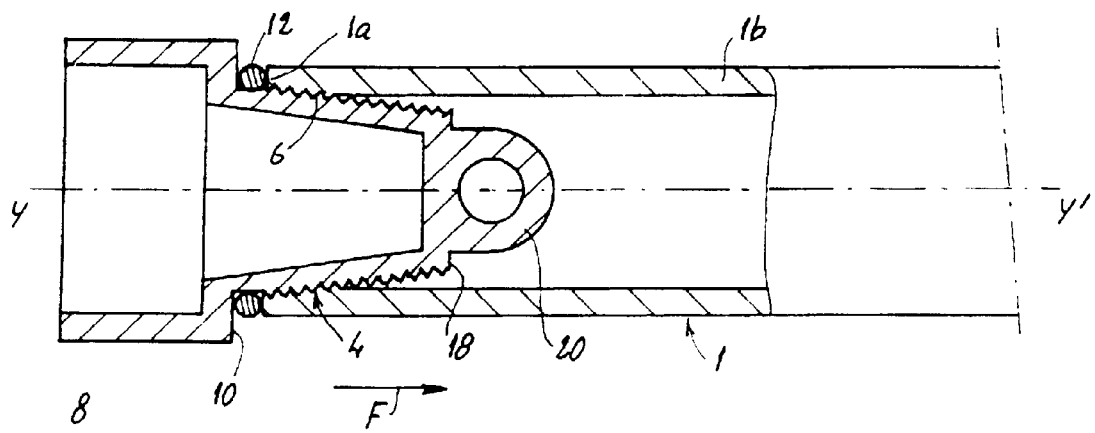
FIG. 2 depicts a view in axial section of a sealing terminal according to claim 1, fitted to an installations duct.

FIG. 2 is a view in section passing through the longitudinal axis Y–Y'of the duct 1. FIG. 2 depicts the sealing terminal 2 screwed into and therefore mounted in one end of the duct 1.

The duct 1 thus has a cylindrical internal surface 1b which is tapped with the self-tapping thread 6. The latter bites at least partially into the material of which the duct 1 is made, lying flush along the internal surface 1b. A close mechanical connection is thus obtained between the duct 1 and the plug 4.

Sealing, both against the inside and against the outside of the duct 1, is obtained with the compression of the annular seal 12 between the edge face 1a of the duct 1 and the peripheral shoulder 10. This compression is achieved by the screwing of the sealing terminal 2 into the duct 1, and doing so in an axial direction F shown in FIG. 2.

The present invention also relates to a method for plugging a plastic installations duct 1 for storing and transporting the latter. This method consists in plugging, in a sealed manner, the ends of the duct 1, which is pressurized or intended to be pressurized with any appropriate fluid.

According to the invention, the method consists in cutting the end of the duct 1 transversely to its longitudinal axis (Y–Y') so as to obtain an edge face 1a, of which the annular surface, with no roughnesses, lies in a plane orthogonal to the longitudinal axis (Y–Y'). Devices for cutting ducts 1 in that way are known per se.

The method also consists in using a sealing terminal 2 for each end of the duct 1 and in screwing each plug 4 into the corresponding end of the duct 1 in the axial direction F.

By virtue of the method according to the invention, the annular seal 12 finds itself compressed between the peripheral shoulder 10 and the corresponding edge face 1a, in the axial direction F, to finish off the screwing operation. The duct 1 is thus plugged in a sealed manner, both from the pneumatic and from the hydraulic standpoints.

What is claimed is:

1. Sealing terminal for an installations duct of tubular shape, comprising:

a plug including a threaded frustoconical part which can be screwed into one end of the duct;

a manipulating head with a peripheral shoulder in a continuation of the plug, said peripheral shoulder being designed to face an edge face of a border around an opening of the duct; and an annular seal arranged against the peripheral shoulder;

wherein the threaded frustoconical part includes a screw thread which is self-tapping; and wherein said terminal is made integrally as a hollow part obtained by molding.

2. Sealing terminal according to claim 1, wherein the manipulating head is externally equipped with knurling.

3. Sealing terminal of claim 2 wherein said knurling is parallel to a longitudinal axis of the duct.

4. Sealing terminal according to claim 1 wherein the manipulating head comprises a hole formed in a wall thereof.

5. Sealing terminal according to claim 1 wherein the frustoconical part of the plug is extended at a free end by an attachment eye.

6. Sealing terminal according to claim 1 further comprising a pressurizing valve allowing the duct on which the pressurizing valve is fitted to be pressurized.

7. Sealing terminal according to claim 6, wherein the pressurizing valve is screwed into a small base of the threaded frustoconical part of the plug.

8. Method for plugging a plastic tubular installations duct for storage and transport, the method comprising:

cutting an end of the duct transversely to a longitudinal axis so as to obtain an edge face whose annular surface is smooth and lies in a plane orthogonal to the longitudinal axis;

using a sealing terminal for said end of the duct, said sealing terminal being made integrally as a hollow part obtained by molding and including a plug having a self-tapping threaded frustoconical part which can be screwed into one end of the duct, a manipulating head with a peripheral shoulder in a continuation of the plug, said peripheral shoulder being designed to face an edge face of a border around an opening of the duct, and an annular seal arranged against the peripheral shoulder;

screwing the plug into the corresponding end of the duct in an axial direction;

cutting a helical thread in the duct with the self-tapping threaded frustoconical part during said screwing; and compressing the annular seal between the peripheral shoulder and the corresponding edge face in the axial direction, to finish said screwing.

\* \* \* \* \*